US012674983B2

(12) United States Patent
Yang et al.

(10) Patent No.: US 12,674,983 B2
(45) Date of Patent: Jul. 7, 2026

(54) NEAR-TO-EYE DISPLAY DEVICE

(71) Applicant: BOE Technology Group Co., Ltd., Beijing (CN)

(72) Inventors: Junxing Yang, Beijing (CN); Zhenxing Zhou, Beijing (CN); Sen Ma, Beijing (CN); Qiuyu Ling, Beijing (CN); Qian Wu, Beijing (CN); Kuanjun Peng, Beijing (CN)

(73) Assignee: BOE Technology Group Co Ltd, Beijing (CN)

( * ) Notice: Subject to any disclaimer, the term of this patent is extended or adjusted under 35 U.S.C. 154(b) by 300 days.

(21) Appl. No.: 18/559,800

(22) PCT Filed: Oct. 22, 2021

(86) PCT No.: PCT/CN2021/125544
§ 371 (c)(1),
(2) Date: Nov. 9, 2023

(87) PCT Pub. No.: WO2022/237077
PCT Pub. Date: Nov. 17, 2022

(65) Prior Publication Data
US 2024/0231108 A1     Jul. 11, 2024

(30) Foreign Application Priority Data

May 12, 2021   (CN) .......................... 202110515522.5

(51) Int. Cl.
| | |
|---|---|
| *G02B 27/01* | (2006.01) |
| *G02B 25/00* | (2006.01) |
| *G02B 27/28* | (2006.01) |

(52) U.S. Cl.
CPC ....... *G02B 27/0172* (2013.01); *G02B 25/001* (2013.01); *G02B 27/283* (2013.01)

(58) Field of Classification Search
None
See application file for complete search history.

(56) References Cited

U.S. PATENT DOCUMENTS

| | | | |
|---|---|---|---|
| 8,269,169 | B1 | 9/2012 | Sinton et al. |
| 2015/0370074 | A1 | 12/2015 | McDowall et al. |

(Continued)

FOREIGN PATENT DOCUMENTS

| | | | | |
|---|---|---|---|---|
| CN | 106842571 A | | 6/2017 | |
| CN | 108459429 A | * | 8/2018 | ......... G02B 27/0172 |

(Continued)

OTHER PUBLICATIONS

International Search Report for PCT/CN2021/125544 Mailed Dec. 17, 2021.

(Continued)

*Primary Examiner* — Sharrief I Broome
*Assistant Examiner* — Journey F Sumlar

(57)     ABSTRACT

Provided is a near-to-eye display device, comprising: a display panel, a light-splitting layer on a light-exit side of the display panel, an imaging lens group on the side of the light-splitting layer away from the display panel, a phase delay layer on the side of the display panel away from the light-splitting layer, a transflective layer on the side of phase delay layer away from display panel. The display panel comprises multiple display units, some of which emit first linearly-polarized light, the others emit second linearly-polarized light; first linearly-polarized light transmits through the light-splitting layer and is imaged on a first focal plane by the imaging lens group, second linearly-polarized light is reflected by the light-splitting layer and transflective layer, is subjected to polarization state transition through the (Continued)

phase delay layer, finally transmits through light-splitting layer and is imaged on a second focal plane by the imaging lens group.

18 Claims, 4 Drawing Sheets

(56) References Cited

U.S. PATENT DOCUMENTS

| | | | | |
|---|---|---|---|---|
| 2015/0378074 A1* | 12/2015 | Kollin | ................. | G02B 5/3016 |
| | | | | 359/485.05 |
| 2017/0227777 A1* | 8/2017 | Carollo | ................ | G02B 27/148 |
| 2019/0235238 A1* | 8/2019 | Choi | ................. | G02B 27/0101 |
| 2021/0208400 A1 | 7/2021 | Hong | | |
| 2022/0252885 A1 | 8/2022 | Wang et al. | | |
| 2022/0317542 A1 | 10/2022 | Guo et al. | | |
| 2022/0397767 A1 | 12/2022 | Wang et al. | | |

FOREIGN PATENT DOCUMENTS

| | | | | |
|---|---|---|---|---|
| CN | 207937700 U | | | 10/2018 |
| CN | 109061884 A | | | 12/2018 |
| CN | 208421422 U | | | 1/2019 |
| CN | 109613705 A | | | 4/2019 |
| CN | 110161697 A | | | 8/2019 |
| CN | 111221143 A | | | 6/2020 |
| CN | 111290164 A | | | 6/2020 |
| CN | 111443491 A | | | 7/2020 |
| CN | 111487786 A | | | 8/2020 |
| CN | 111766706 A | | | 10/2020 |
| CN | 212460200 U | * | | 2/2021 |
| CN | 113253458 A | | | 8/2021 |

OTHER PUBLICATIONS

Office Action dated Mar. 29, 2022 for Chinese Patent Application No. 2021105155225 and English Translation.

* cited by examiner

1121 p p a a1          a2

112a        112b

113

112

111

NEAR-TO-EYE DISPLAY DEVICE

CROSS-REFERENCE TO RELATED APPLICATIONS

The present application is a U.S. National Phase Entry of International Application No. PCT/CN2021/125544 having an international filing date of Oct. 22, 2021, which claims the priority of the Chinese patent application No. 202110515522.5 filed to the CNIPA on May 12, 2021, which are hereby incorporated herein by reference in their entireties.

TECHNICAL FIELD

The present disclosure relates to the technical field of display, in particular to a near-eye display apparatus.

BACKGROUND

With the continuous development of near-eye display technology, near-eye display products have been widely used in civil fields such as film and television, education and medical treatment from the initially applied military field.

Augmented Reality (AR) technology is an enhanced projection method that superimposes virtual scenes on the real environment. These two popular display modes have entered the public's field of vision and started to be widely used. AR display may integrate the external environment and the virtual world, presenting a vivid interactive experience. In recent years, many AR display apparatuses have emerged one after another. At present, AR display apparatuses achieve 3D function based on parallax, and there is a common problem that the focus and convergence depth do not match, which thus causes users' physiological discomfort, resulting in dizziness, visual fatigue and other symptoms.

SUMMARY

A near-eye display apparatus is provided in an embodiment of the present disclosure, including:

a display panel, configured to display an image, wherein the display panel includes multiple display units, a part of the display units emits first linearly polarized light, and the rest of the display units emits second linearly polarized light; polarization directions of the first linearly polarized light and the second linearly polarized light are perpendicular to each other;

a light splitting layer, located on a light exit side of the display panel and configured to transmit the first linearly polarized light and reflect the second linearly polarized light;

a semi-transparent and semi-reflective layer, located on a side of the display panel away from the light splitting layer;

a phase delay layer, located between the display panel and the semi-transparent and semi-reflective layer, and configured to convert the second linearly polarized light reflected by the light splitting layer into circularly polarized light and convert circularly polarized light reflected by the semi-transparent and semi-reflective layer into first linearly polarized light; and an imaging lens group, located on a side of the light splitting layer away from the display panel.

In some embodiments of the disclosure, the display panel includes:

a base substrate;

multiple pixel islands, arranged in an array on a side of the base substrate; and a polarization layer, located on a side of the pixel islands away from the base substrate;

wherein one pixel island and the polarization layer corresponding to the pixel island constitute one display unit, and the pixel island includes multiple pixel units, one of which includes multiple sub-pixel units with different colors; and the pixel island is classified as a first pixel island and a second pixel island, wherein polarization directions of a polarization layer corresponding to the first pixel island and a polarization layer corresponding to the second pixel island are perpendicular to each other.

In some embodiments of the present disclosure, the first pixel island and the second pixel island are alternately arranged in a first direction and a second direction, wherein the first direction intersects with the second direction.

In some embodiments of the present disclosure, there is a gap between adjacent pixel islands.

In some embodiments of the present disclosure, a size of the pixel island is 0.5 mm to 2 mm; and a width of the gap between the adjacent pixel islands is 0.5 mm to 1.5 mm.

In some embodiments of the disclosure, the display panel is one of an organic light emitting diode display panel, a micro organic light emitting diode display panel, and a micro light emitting diode display panel.

In some embodiments of the present disclosure, the light splitting layer is one of a reflective polarizer or a metal wire grid polarizer.

In some embodiments of the present disclosure, the phase delay layer is a quarter-wave plate, and an included angle between an optical axis of the quarter-wave plate and a polarization direction of the first linearly polarized light and an included angle between the optical axis of the quarter-wave plate and a polarization direction of the second linearly polarized light are both 45°.

In some embodiments of the present disclosure, a ratio of a reflectivity to a transmittance of the semi-transparent and semi-reflective layer is 1:1.

In some embodiments of the present disclosure, the imaging lens group includes at least one lens, wherein a surface shape of the lens is one of a spherical surface, an aspherical surface, a Fresnel surface, or a free-form surface.

In some embodiments of the disclosure, a distance between the display panel and the imaging lens group is less than a focal length of the imaging lens group.

In some embodiments of the present disclosure, the light splitting layer is attached to a surface of the light exit side of the display panel, the phase delay layer is attached to a surface of a side of the display panel away from the light splitting layer, and the semi-transparent and semi-reflective layer is attached to a surface of a side of the phase delay layer away from the display panel.

In some embodiments of the disclosure, the near-eye display apparatus is an augmented reality display apparatus.

BRIEF DESCRIPTION OF DRAWINGS

In order to describe technical solutions in embodiments of the present disclosure more clearly, the drawings to be used in the embodiments of the present disclosure will be introduced below in brief. It will be apparent that the drawings introduced below are only some of the embodiments of the present disclosure, and one skilled in the art may obtain other drawings according to these drawings without paying any inventive effort.

Figure 1:
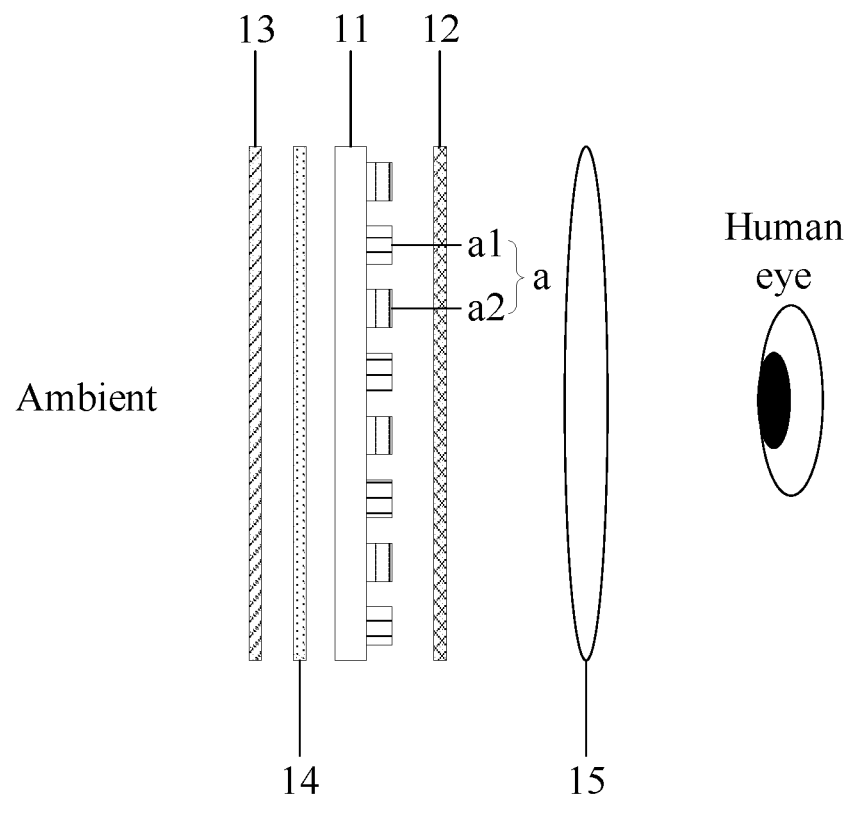
FIG. 1 is a first schematic diagram of a side view of a structure of a near-eye display apparatus provided by an embodiment of the present disclosure.

Herein, 11—Display panel, 12—Light splitting layer, 13—Semi-transparent and semi-reflective layer, 14—Phase delay layer, 15—Imaging lens group, 111—Base substrate, 112—Pixel island, 112*a*—First pixel island, 112*b*—Second pixel island, 113—Polarization layer, 1121—Pixel unit, p—Sub-pixel unit, a—Display unit, a1—First display unit, a2—Second display unit, S1—First focal plane, and S2—Second focal plane.

DETAILED DESCRIPTION

In order to make the above objects, features and advantages of the present disclosure be more clearly understood, the disclosure will be further explained below in conjunction with the accompanying drawings and embodiments. However, exemplary implementations may be implemented in a variety of forms and should not be construed as being limited to implementations set forth herein. Rather, these implementations are provided so that the present disclosure will be more comprehensive and complete, and concepts of the exemplary implementations will be fully conveyed to those of skills in the art. Same reference numerals in the drawings represent identical or similar structures and thus repeated description thereof will be omitted. The words for expressing position and direction described in the present disclosure are described by taking the drawings as an example, however they may be changed as required, and all the changes are included in the protection scope of the present disclosure. The drawings of the present disclosure are only used to illustrate the relative positional relationship, and do not represent the true scale.

A near-eye display apparatus refers to a display device worn on the eye of a user. For example, the near-eye display apparatus is usually presented in the form of glasses or helmet. The near-eye display apparatus may provide AR experience for users. Herein, AR near-eye display technology is a superposition display of virtual images generated by the near-eye display apparatus and real images in the real world, so that users can see the final augmented real images from the screen.

There is usually only one position of an image plane generated by the near-eye display apparatus, but the brain will delivery signals focused by multiple image distances based on stereoscopic images to the optic nerve of human eyes for the fusion of stereoscopic display. The brain modulation signals received by the optic nerve of human eyes conflict with the only position of the image plane focused actually by the human eyes, which leads to eye fatigue and dizziness, that is, vergence-accommodation conflict, in the process of continuous viewing dynamic 3D images.

In order to overcome the above problems, a multi-plane display scheme may be adopted to achieve multi-plane display by spatial multiplexing of multiple display screens. However, the volume of the near-eye display apparatus becomes huge with the increase of the number of flat in panel displays, and the cost also increases accordingly. Alternatively, a zoom lens may be arranged in a near-eye display apparatus, but the relative response speed of the zoom lens is limited, thus affecting the experience effect of multi-focal plane display.

In view of the above existing problems, the present disclosure provides a near-eye display apparatus, which can effectively solve the problem of vergence-accommodation conflict, improve the visual experience of near-eye display. The near-eye display apparatus has a compact overall structure and small volume, and it is convenient to carry the near-eye display apparatus.

FIG. 1 is a first schematic diagram of a side view of a structure of a near-eye display apparatus provided by an embodiment of the present disclosure.

As shown in FIG. 1, the near-eye display apparatus provided by the embodiment of the present disclosure includes a display panel 11, a light splitting layer 12, a phase delay layer 13, a semi-transparent and semi-reflective layer 14 and an imaging lens group 15.

The display panel 11 is configured to display an image. In the embodiment of the present disclosure, the display panel 11 adopts a self-luminous display panel, so that a backlight module may be omitted, which is beneficial for reducing the overall thickness of the display panel and reducing the weight of the display panel so as to make the near-eye display apparatus lighter and easier to wear.

In a specific implementation, the display panel 11 may be one of an Organic Light Emitting Diode (OLED for short) display panel, a Micro-Organic Light Emitting Diode (Micro-OLED for short) display panel and a Mini Light Emitting Diode (Mini-LED for short) display panel.

OLED display is also called Organic Electroluminescence Display or Organic Light Emitting Diode Display. The light-emitting device in an OLED display panel is OLED, which is a current-type organic light-emitting device, and emits light through the injection and compound of carriers, wherein the luminescence intensity is proportional to the injected current. Under the action of an electric field, the holes generated by the anode and the electrons generated by the cathode in an OLED will move, inject into a hole transport layer and an electron transport layer respectively, and migrate to a light emitting layer. When they meet in the light emitting layer, energy excitons are generated, which thus excites luminescent molecules and finally generates visible light. The OLED display panel is a self-luminous display panel, so there is no need to be equipped with a backlight module, and the overall thickness of the device is small, facilitating the miniaturization of the near-eye display apparatus, and more beneficial to the installation of the whole machine.

Micro-OLED display panel is a miniaturization of OLED devices, which can arrange more pixels in a limited size and improve the resolution of the display screen.

The light emitting device in the Mini-LED display panel is Mini-LED, and the Mini-LED display panel is a display screen forming by LED arrays, which uses Mini-LED as the display sub-pixel, and can achieve image display by controlling the display brightness of each Mini-LED. LED display has the characteristics of high brightness, low power consumption, low voltage demand, small and convenient, etc., and Mini-LED is a miniaturization of LED, so it has the same advantages as LED and has smaller size, which can thus arrange more pixels in a limited display region and improve the image resolution.

In addition, other types of display panels may be adopted, which is not limited in the embodiments of the present disclosure herein.

The light splitting layer 12 is located on a light exit side of the display panel 11 and configured to transmit first linearly polarized light and reflect second linearly polarized light, wherein polarization directions of the first linearly polarized light and the second linearly polarized light are perpendicular to each other.

In a specific implementation, the light splitting layer 12 may be one of a reflective polarizer or a metal wire grid polarizer.

The reflective polarizer may usually transmit the linearly polarized light whose polarization direction is parallel to a light entrance surface, and reflect the linearly polarized light whose polarization direction is perpendicular to the light entrance surface, thus achieving the purpose of splitting light by reflecting.

The metal wire grid polarizer includes multiple metal wire grids arranged in parallel, the linearly polarized light whose polarization direction is parallel to the metal wire grid may be transmitted through the metal wire grid polarizer, and the linearly polarized light whose polarization direction is perpendicular to the metal wire grid is reflected by metal wire grid polarizer, thereby achieving the purpose of splitting light by reflecting.

In addition, other devices capable of achieving splitting light by reflecting may be used as the light splitting layer, which is not limited in the embodiments of the present disclosure herein.

A semi-transparent and semi-reflective layer 13 is located on a side of the display panel 11 away from the light splitting layer 12. The semi-transparent and semi-reflective layer may reflect the light reflected by the light splitting layer 12 towards the direction of the light splitting layer 12 again, and the ambient light may transmit through the semi-transparent and semi-reflective layer at the same time, thereby achieving the AR effect.

The semi-transparent and semi-reflective layer 13 may be stacked with multiple dielectric layers, the refractive indexes of adjacent dielectric layers are different, and different transmittance-reflection ratios may be achieved by adjusting the refractive indexes of the dielectric layers and the thicknesses of the dielectric layers. In an embodiment of the present disclosure, a ratio of a reflectivity to a transmittance of the semi-transparent and semi-reflective layer 13 may be 1:1, which can thus effectively reflect the light reflected by the light splitting layer 12 and effectively transmit the ambient light at the same time, thereby achieving a better AR display effect.

The phase delay layer 14 is located between the display panel 11 and the semi-transparent and semi-reflective layer 13, and is configured to convert the second linearly polarized light reflected by the light splitting layer 12 into circularly polarized light and convert the circularly polarized light reflected by the semi-transparent and semi-reflective layer 13 into the first linearly polarized light.

The phase delay layer 14 has a phase delay function, thereby it can convert the polarization state of light. In an embodiment of the present disclosure, the phase delay layer 14 may adopt a quarter-wave plate, and an included angle between an optical axis of the quarter-wave plate and a polarization direction of the first linearly polarized light and an included angle between the optical axis of the quarter-wave plate and a polarization direction of the second linearly polarized light are both 45°. Thus the phase delay layer 14 can convert the incident linearly polarized light into circularly polarized light and the incident circularly polarized light into linearly polarized light.

The imaging lens group 15 is located on a side of the light splitting layer 12 away from the display panel 11. The imaging lens group 15 is located close to the human eye for imaging the display image of the display panel 11. Since the display panel 11 is small in size when used in a near-eye display apparatus, the human eye cannot directly view the display image of the display panel 11, the imaging lens group 15 is used for enlarging the display image and imaging it directly in front of the human eye.

In a specific implementation, a distance between the display panel 11 and the imaging lens group 15 is smaller than a focal length of the imaging lens group 15 and thus an upright enlarged virtual image can be obtained.

In an embodiment of the present disclosure, the imaging lens group 15 includes at least one lens (FIG. 1 is illustrated by taking an imaging lens group only including one lens as an example), and a surface shape of the lens is one of a spherical surface, an aspherical surface, a Fresnel surface or a free-form surface.

Spherical lens has the advantages of simple design and low assembly accuracy requirements. However, the thickness of aspherical lens, Fresnel lens and free-form lens is relatively small, which can optimize the image quality, thereby the lens may be selected according to the actual requirements in optical design.

The material of the lens in the imaging lens group 15 may be glass or plastic, which is not limited herein.

As shown in FIG. 1, in an embodiment of the present disclosure, the display panel includes multiple display units a, wherein some display units are first display units a1, the rest are second display units a2. The first display unit a1 emits first linearly polarized light, and the second display unit a2 emits second linearly polarized light, wherein polarization directions of the first linearly polarized light and the second linearly polarized light are perpendicular to each other. Thus, the display panel 11 may emit two kinds of linearly polarized light whose polarization directions are perpendicular to each other.

Figure 2:
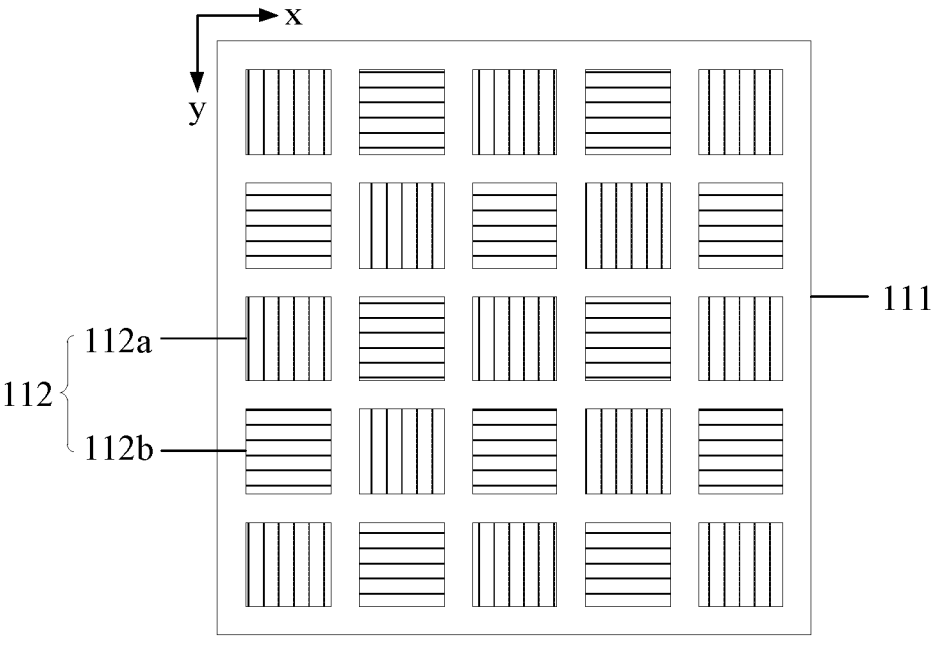
FIG. 2 is a schematic diagram of a planar structure of a display panel provided by an embodiment of the present disclosure.
Figures 3, 4:
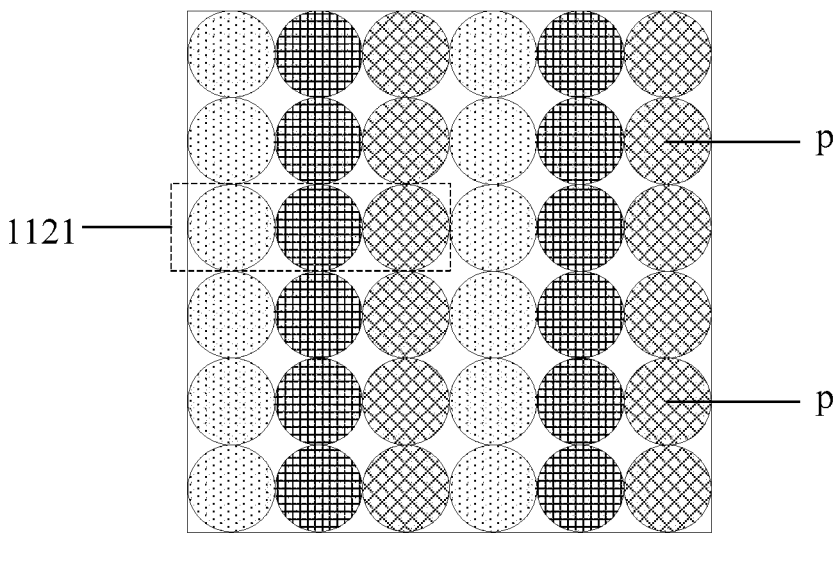
FIG. 3 is a schematic diagram of a planar structure of a pixel island provided by an embodiment of the present disclosure.
FIG. 4 is a schematic diagram of a sectional structure of a display panel provided by an embodiment of the present disclosure.

FIG. 2 is a schematic diagram of a planar structure of a display panel provided by an embodiment of the present disclosure, and FIG. 3 is a schematic diagram of a planar structure of a pixel island provided by an embodiment of the present disclosure.

As shown in FIG. 2, the display panel includes a base substrate 111 and a pixel island 112. The base substrate 111 is usually located at the bottom of the display panel and has a bearing function. The base substrate 111 may be made of transparent glass or other transparent materials with high optical transparency, without special refractive index requirements. The base substrate 111 mainly plays a role of transmitting ambient light and required reflected light, and supports an image display assembly as a carrier.

Multiple pixel islands 112 are arranged in an array on a side of the base substrate 111. Each pixel island 112 is configured to display a portion of an image, and a complete display image is formed by various pixel islands 112.

As shown in FIG. 3, the pixel island 112 includes multiple pixel units 1121, one of which includes multiple sub-pixel units p with different colors. The sub-pixel units p with different colors may emit lights of different colors, which can achieve a full-color display together with different brightness values.

For example, one pixel unit 1121 may include a red sub-pixel, a green sub-pixel and a blue sub-pixel, and one pixel island 112 includes multiple pixel units 1121 arranged in an array. The pixel units 1121 within the pixel island 112 are closely arranged, and there is a certain gap between adjacent pixel islands 112, so that the number of pixel units may be ensured to be sufficient, and ambient light may be transmitted through the gaps between the pixel islands, thereby achieving AR display with high resolution.

In an embodiment of the present disclosure, a size of the pixel island 112 is 0.5 mm to 2 mm; and a width of the gap between the adjacent pixel islands is 0.5 mm to 1.5 mm. The size of the pixel island 112 depends on the number of pixel units contained, and the width of the gap between the pixel islands is generally smaller than the size of the pixel island.

FIG. 4 is a schematic diagram of a sectional structure of a display panel provided by an embodiment of the present disclosure.

As shown in FIG. 4, the display panel further includes: a polarization layer 113, located on a side of the pixel islands 112 away from the base substrate 111. The light emitted from the pixel island 112 is converted into linearly polarized light when passing through the polarization layer 113. One pixel island 112 and a polarization layer 113 corresponding to the pixel island 112 constitute one display unit a.

The display panel provided by an embodiment of the present disclosure may be a self-luminous display panel, and a surface of a light emitting device in the self-luminous display panel is generally provided with an encapsulation structure, wherein the polarization layer 113 may be formed on a surface of the encapsulation structure, or may be directly formed inside the encapsulation structure if the process permits, which is not limited herein.

The display unit a in an embodiment of the present disclosure is classified as a first display unit a1 for emitting first linearly polarized light and a second display unit a2 for emitting second linearly polarized light. Accordingly, in an embodiment of the present disclosure, multiple pixel islands 112 is classified as a first pixel island 112*a* and a second pixel island 112*b*, wherein the polarization directions of the polarization layer 113 corresponding to the first pixel island 112*a* and the polarization layer 113 corresponding to the second pixel island 112*b* are perpendicular to each other. Thus, the light emitted from the first pixel island 112*a* is converted into the first linearly polarized light after passing through the corresponding polarization layer 113, and the light emitted from the second pixel island 112*b* is converted into the second linearly polarized light after passing through the corresponding polarization layer 113.

Figure 5:
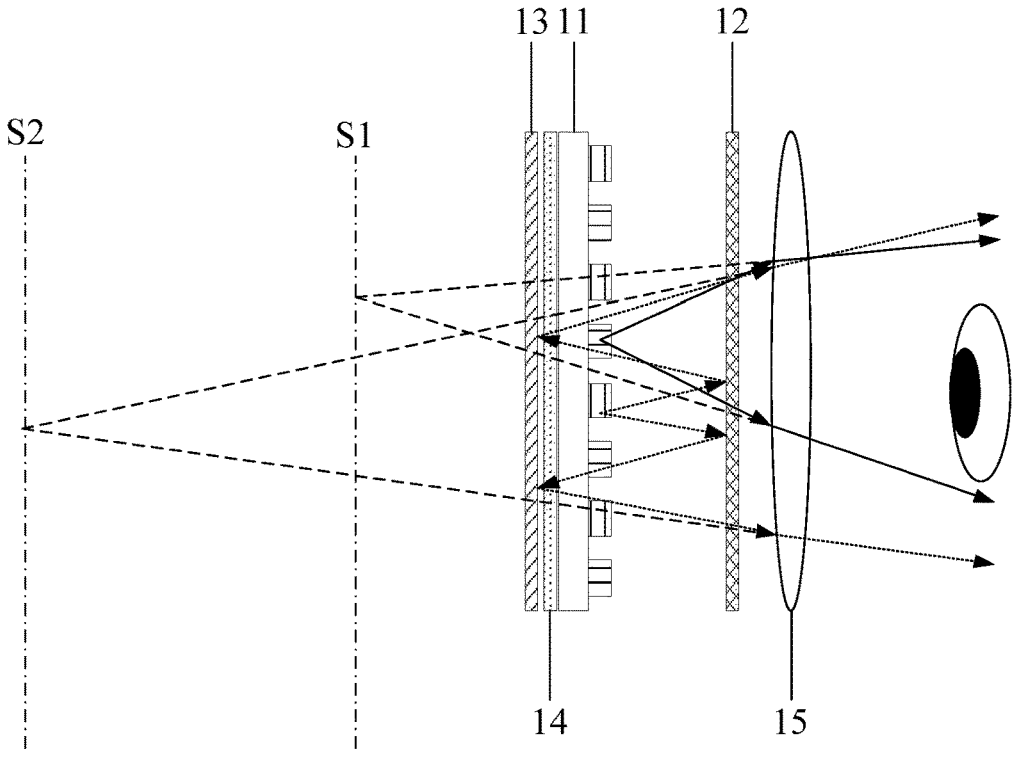
FIG. 5 is a first principle diagram of an optical path provided by an embodiment of the present disclosure.

FIG. 5 is a first principle diagram of an optical path of a near-eye display apparatus provided by an embodiment of the present disclosure.

As shown in FIG. 5, the display panel 11 emits the first linearly polarized light and the second linearly polarized light, and since the light splitting layer 12 may transmit the first linearly polarized light and reflect the second linearly polarized light, the human eye may view the imaging of the first linearly polarized light on a first focal plane S1 after the transmitted first linearly polarized light is imaged by the imaging lens group 15. The reflected second linearly polarized light passes through the gap in the display panel and is incident on the phase retarding layer 14, and is converted into first circularly polarized light (which may be, for example, left-handed rotation circularly polarized light) under the action of the phase delay layer 14. After the first circularly polarized light is incident on the semi-transparent and semi-reflective layer 13, a portion of the first circularly polarized light is directly transmitted and a portion of the first circularly polarized light is reflected, wherein the transmitted first circularly polarized light does not participate in imaging, and the reflected circularly polarized light rotates to an opposite direction, so the first circularly polarized light reflected by the semi-transparent and semi-reflective layer is converted into second circularly polarized light with an opposite rotation direction (which may be, for example, right-handed rotation circularly polarized light). The second circularly polarized light is converted into first linearly polarized light whose polarization direction is perpendicular to the polarization direction of the second linearly polarized light after passing through the phase delay layer 14 again, and the first linearly polarized light may be transmitted through by the light splitting layer 12. Since the transmitted light was reflected before, the image distance is increased and is imaged on a further second focal plane S2 after being imaged by the imaging lens group 15, and the human eye may view the imaging of the previously reflected second linearly polarized light. Thus, multi-focal plane image display may be achieved, and 3D images with multiple depths of field may be seen by human eyes, thus effectively solving the problem of vergence-accommodation conflict.

Figure 6:
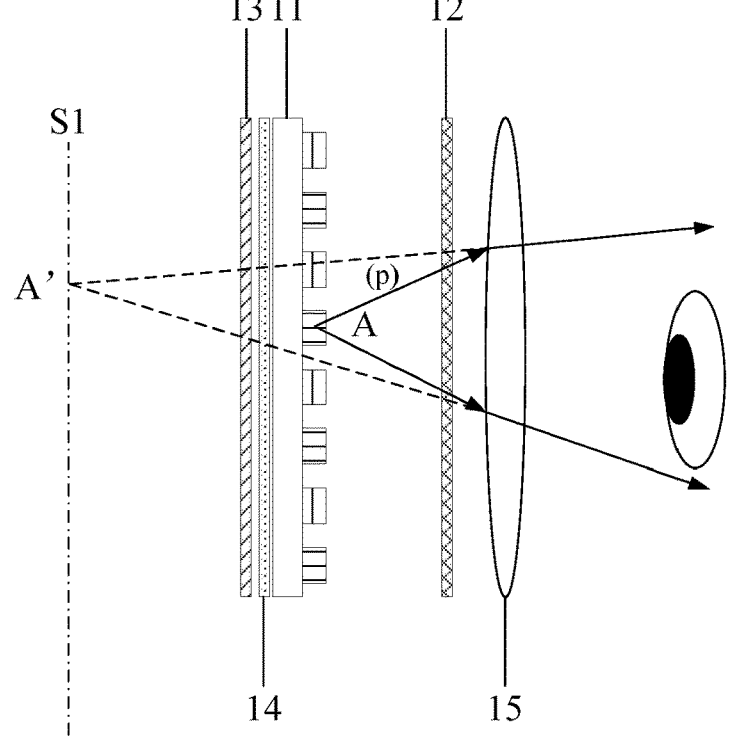
FIG. 6 is a second principle diagram of an optical path provided by an embodiment of the present disclosure.

FIG. 6 is a principle diagram of an optical path of the first linearly polarized light provided by an embodiment of the present disclosure.

As shown in FIG. 6, taking a light exit point A in the first pixel island as an example, the light beam emitted from the point A is modulated by a polarizer on a surface of the first pixel island to form first linearly polarized light (which may be, for example, p light). When the first linearly polarized light propagates to the light splitting layer 12, since the light splitting layer 12 may transmit the first linearly polarized light, the first linearly polarized light is directly transmitted through the light splitting layer 12 and is incident on the surface of the imaging lens group 15, enters the human eye for imaging after being modulated by the imaging lens group 15. Light entering the human eye may intersect at point A ' when reversely extended, that is, an image formed by the light exit point A in front of the human eye, wherein a plane where the imaging point A' is located is a first focal plane S1, i.e., a near focal plane. Similarly, the display images formed by all the light exit points in the first pixel island in the display panel 11 may all be imaged on the first focal plane S1, and finally a complete near image may be imaged on the first focal plane S1.

Figure 7:
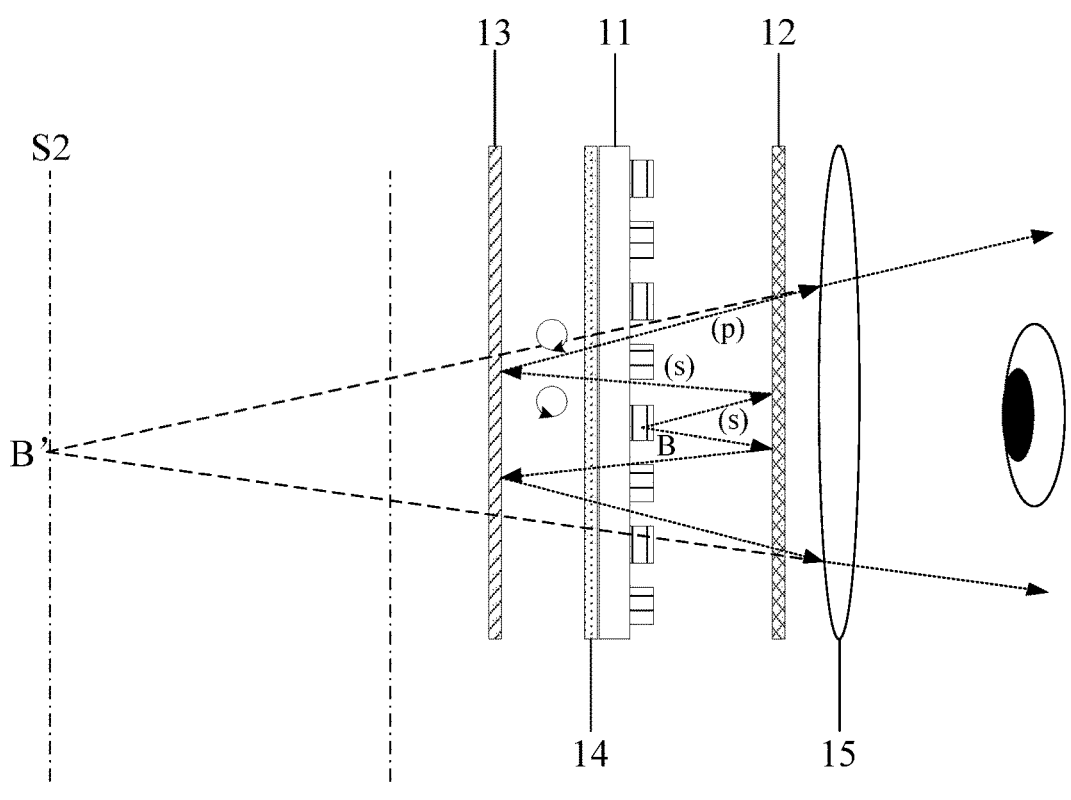
FIG. 7 is a third principle diagram of an optical path provided by an embodiment of the present disclosure.

FIG. 7 is a principle diagram of an optical path of the second linearly polarized light provided by an embodiment of the present disclosure.

As shown in FIG. 7, taking a light exit point B in the second pixel island as an example, the light beam emitted from the point B is modulated by a polarizer on a surface of the second pixel island to form second linearly polarized light (which may be, for example, s light). When the second linearly polarized light propagates to the light splitting layer 12, since the light splitting layer 12 may reflect the second linearly polarized light, the second linearly polarized light cannot be transmitted through the light splitting layer 12 to be incident on a surface of the imaging lens group 15, but is reflected back. As shown in FIG. 7, the reflected second linearly polarized light is first incident on the phase delay layer 14, and is converted into the first circularly polarized light (which may be, for example, left-handed rotation circularly polarized light) under the action of the phase delay layer. The first circularly polarized light is then reflected by the semi-transparent and semi-reflective layer 13 and converted into the second circularly polarized light with an opposite rotation direction (which may be, for example, right-handed rotation circularly polarized light). The second circularly polarized light passes through the phase delay layer 14 again, and is converted into first linearly polarized light (which may be, for example, p light) under the action of the phase delay layer, which may further be transmitted through the light splitting layer 12 and enter the human eye for imaging through the modulation by the imaging lens group 15. Since the optical path of the second linearly polarized light is increased through the reflection, light entering the human eye may intersect at another farther intersection point B' when reversely extended, that is, an image formed by the light exit point B in front of the human eye, and the plane where the imaging point B' is located is the second focal plane S2, i.e., a far focal plane. Similarly, the display images formed by the light exit points in all the second pixel islands of the display panel 11 may all be imaged on the second focal plane S2, and finally a complete background image may be imaged on the second focal plane S2.

Thus, two focal planes are formed at different distances in space, thus achieving multi-focal plane display and effectively alleviating the problem of vergence-accommodation conflict.

In order to make the foreground image and the background image to be displayed continuously and uniformly throughout the display region, as shown in FIG. 2, an embodiment of the present disclosure may alternately arrange the first pixel islands 112*a* and the second pixel islands 112*b* in the first direction x and the second direction y. Herein, the first direction x may be a direction of sub-pixel unit rows, the second direction y may be a direction of sub-pixel unit columns, and the first direction x and the second direction y may be perpendicular to each other.

Figure 8:
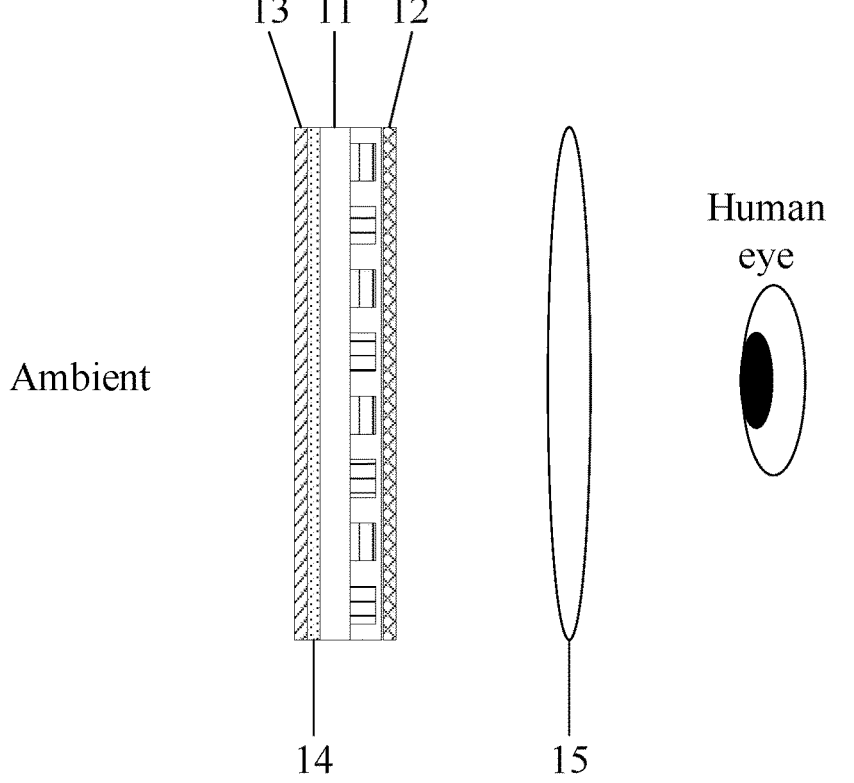
FIG. 8 is a second schematic diagram of a side view of a structure of a near-eye display apparatus provided by an embodiment of the present disclosure.

FIG. 8 is a second schematic diagram of a side view of a structure of a near-eye display apparatus provided by an embodiment of the present disclosure.

As shown in FIG. 8, in order to make the structure of the near-eye display apparatus more compact and reduce the assembly difficulty, the display panel 11, the light splitting layer 12, the phase delay layer 14, and the semi-transparent and semi-reflective layer 13 may be attached to each other. Specifically, as shown in FIG. 8, the light splitting layer 12 may be attached to a surface of a light exit side of the display panel 11, the phase delay layer 14 may be attached to a surface of a side of the display panel 11 away from the light splitting layer 12, and the semi-transparent and semi-reflective layer 13 may be attached to a surface on a side of the phase delay layer 14 away from the display panel 11. The film layers may be attached to each other through transparent adhesive.

In the above-mentioned near-eye display apparatus provided by an embodiment of the present disclosure, there is a gap between the pixel islands 112, so the ambient light may be incident to the human eye through the gaps between the pixel islands, and thus the human eye can view the ambient image and the 3D image of the display panel at the same time, thereby achieving augmented reality display.

Although alternative embodiments of the present disclosure have been described, those skilled in the art may make additional changes and modifications to these embodiments once the basic inventive concepts are known. Therefore, the appended claims are intended to be interpreted as encompassing alternative embodiments as well as all changes and modifications falling within the scope of the present disclosure.

It is apparent that various modifications and variations of the present disclosure may be made by those skilled in the art without departing from the spirit and scope of the present disclosure. Thus, if these modifications and variations of the present disclosure fall within the scope of the claims of the present disclosure and their equivalent techniques, the present disclosure is intended to include these modifications and variations.

The invention claimed is:

1. A near-eye display apparatus, comprising:
   a display panel, configured to display an image, wherein the display panel comprises a plurality of display units, a part of the display units emits first linearly polarized light, and the rest of the display units emits second linearly polarized light; polarization directions of the first linearly polarized light and the second linearly polarized light are perpendicular to each other;
   a light splitting layer, located on a light exit side of the display panel and configured to transmit the first linearly polarized light and reflect the second linearly polarized light;
   a semi-transparent and semi-reflective layer, located on a side of the display panel away from the light splitting layer;
   a phase delay layer, located on the side of the display panel away from the light splitting layer and between the display panel and the semi-transparent and semi-reflective layer, and configured to convert the second linearly polarized light reflected by the light splitting layer into circularly polarized light and convert circularly polarized light reflected by the semi-transparent and semi-reflective layer into first linearly polarized light; and
   an imaging lens group, located on the light exit side of the display panel and a side of the light splitting layer away from the display panel;
   wherein the light splitting layer is located between the display panel and the imaging lens group.

2. The near-eye display apparatus according to claim 1, wherein the display panel comprises:
   a base substrate;
   a plurality of pixel islands, arranged in an array on a side of the base substrate; and
   a polarization layer, located on a side of the pixel islands away from the base substrate;
   wherein one pixel island and a polarization layer corresponding to the pixel island constitute one display unit, and the pixel island comprises a plurality of pixel units, one of which comprises a plurality of sub-pixel units with different colors; and
   the pixel island is classified as a first pixel island and a second pixel island, wherein polarization directions of a polarization layer corresponding to the first pixel island and a polarization layer corresponding to the second pixel island are perpendicular to each other.

3. The near-eye display apparatus according to claim 2, wherein the first pixel island and the second pixel island are alternately arranged in a first direction and a second direction; and the first direction intersects with the second direction.

4. The near-eye display apparatus according to claim 2, wherein there is a gap between adjacent pixel islands.

5. The near-eye display apparatus according to claim 4, wherein a size of the pixel island is 0.5 mm to 2 mm; and a width of the gap between the adjacent pixel islands is 0.5 mm to 1.5 mm.

6. The near-eye display apparatus according to claim 4, wherein a width of the gap between the pixel islands is smaller than the size of the pixel island.

7. The near-eye display apparatus according to claim 2, wherein the display panel further comprises an encapsulation structure, the polarization layer is formed on a surface of the encapsulation structure.

8. The near-eye display apparatus according to claim 2, wherein the display panel further comprises an encapsulation structure, the polarization layer is formed inside the encapsulation structure.

9. The near-eye display apparatus according to claim 1, wherein the display panel is one of an organic light emitting diode display panel, a micro organic light emitting diode display panel, and a micro light emitting diode display panel.

10. The near-eye display apparatus according to claim 1, wherein the light splitting layer is one of a reflective polarizer or a metal wire grid polarizer.

11. The near-eye display apparatus according to claim 1, wherein the phase delay layer is a quarter-wave plate, and an included angle between an optical axis of the quarter-wave plate and a polarization direction of the first linearly polarized light and an included angle between the optical axis of the quarter-wave plate and a polarization direction of the second linearly polarized light are both 45°.

12. The near-eye display apparatus according to claim 1, wherein a ratio of a reflectivity to a transmittance of the semi-transparent and semi-reflective layer is 1:1.

13. The near-eye display apparatus according to claim 1, wherein the imaging lens group comprises at least one lens, a surface shape of which is one of a spherical surface, an aspherical surface, a Fresnel surface, or a free-form surface.

14. The near-eye display apparatus according to claim 13, wherein a distance between the display panel and the imaging lens group is less than a focal length of the imaging lens group.

15. The near-eye display apparatus according to claim 1, wherein the light splitting layer is attached to a surface of the light exit side of the display panel, the phase delay layer is attached to a surface of a side of the display panel away from the light splitting layer, and the semi-transparent and semi-reflective layer is attached to a surface of a side of the phase delay layer away from the display panel.

16. The near-eye display apparatus according to claim 1, wherein the near-eye display apparatus is an augmented reality display apparatus.

17. The near-eye display apparatus according to claim 1, wherein the first linearly polarized light transmitted by the light splitting layer is imaged on a first focal plane by the imaging lens group; and the first linearly polarized light converted by the phase delay layer is imaged on a second focal plane by the imaging lens group.

18. The near-eye display apparatus according to claim 17, wherein the first focal plane is a near focal plane, and the second focal plane is a far focal plane.

\* \* \* \* \*